(12) United States Patent
Arima (10) Patent No.: US 7,237,846 B1
(45) Date of Patent: Jul. 3, 2007

(54) RESIN SIDE COVER FOR AUTOMOTIVE SEAT

(75) Inventor: Hiroshi Arima, Akisha (JP)

(73) Assignee: Tachi-S Co. Ltd., Tokyo (JP)

( * ) Notice: Subject to any disclaimer, the term of this patent is extended or adjusted under 35 U.S.C. 154(b) by 0 days.

(21) Appl. No.: 11/350,763

(22) Filed: Feb. 10, 2006

(51) Int. Cl.
*B60N 2/00* (2006.01)

(52) U.S. Cl. .............................. 297/452.38; 297/452.18

(58) Field of Classification Search ........... 297/452.18, 297/452.38, 463.2
See application file for complete search history.

(56) References Cited

U.S. PATENT DOCUMENTS

| | | | | |
|---|---|---|---|---|
| 5,007,682 A | * | 4/1991 | Kuwabara et al. | 297/452.38 |
| 5,288,133 A | * | 2/1994 | Mizushima et al. | 297/452.38 |
| 6,149,241 A | * | 11/2000 | Waku et al. | 297/463.2 |

FOREIGN PATENT DOCUMENTS

| JP | 6247201 | * | 6/1994 |
|---|---|---|---|
| JP | 7-266946 | | 10/1995 |

* cited by examiner

*Primary Examiner*—Milton Nelson, Jr.
(74) *Attorney, Agent, or Firm*—Browdy and Neimark, PLLC (57) ABSTRACT

A resin side cover for covering a side frame member of seat cushion frame of automotive seat, which includes outer and inner cover elements. First and second female engagement elements are respectively provided to forward and backward regions of the outer cover element, whereas first and second male engagement elements of resin material are respectively provided to a forward region of the side frame member and the inner cover element. The first female engagement element has an engagement portion defined therein at a predetermined position. The first male engagement element has a latch element defined therein at a point corresponding to such predetermined position, thus allowing the latch portion to be latchingly engageable with the engagement portion of the first female engagement element, while allowing the latch portion to be disengageable from that engagement portion by displacing the first female engagement element from the foregoing predetermined position.

6 Claims, 5 Drawing Sheets

RESIN SIDE COVER FOR AUTOMOTIVE SEAT

BACKGROUND OF THE INVENTION

1. Field of the Invention

The present invention relates to a side cover of a resin or synthetic resin material which is used for an automotive seat. In particular, the invention is directed to the side cover of this kind which can easily be attached to and removed from a lateral side portion of the automotive seat.

2. Description of Prior Art

As well known, a side cover is securely attached to a lateral side of automotive seat for protection and decoration purposes. In the case where the automotive seat includes a reclining device provided between its seat back and seat cushion and further includes a fore-and-aft adjustment device (e.g. slide rail device) provided under the seat cushion, the side cover is basically formed by: a main side cover element for covering an entire lateral side portion of the seat cushion as well as an outwardly exposed lateral part of the reclining device; and an auxiliary side cover element for covering a riser member or the like where the a part of the fore-and-aft adjustment device is provided.

Normally, the main side cover element comprises an outer cover member and an inner cover member, whereas the auxiliary side cover element also comprises an outer cover member and an inner cover member. That is, in light of an intricate formation of lateral side portion of the seat cushion frame including the reclining device and fore-and-aft adjustment device, the outer cover member is attached via the inner cover member to such seat cushion frame lateral side portion for both of the main and auxiliary cover elements, Conventionally, those outer and inner cover members are securely connected together by means of anchor springs and also securely attached by such anchor springs to the pertinent lateral portions of the seat cushion frame, reclining device and fore-and-aft adjustment device.

However, with such arrangement, it is indeed easy to attach the outer and inner cover members to those pertinent lateral portions, but, it is quite troublesome and difficult to remove those cover members from the respective portions in the process of disassembling the seat.

SUMMARY OF THE INVENTION

In view of the above-stated drawbacks, it is a purpose of the present invention to provide a resin side cover which can easily be securely attached to and removed from a side frame member and/or a riser member of an automotive seat, while allowing reuse or recycle of the resin side cover itself.

In order to achieve such purpose, a resin side cover for automotive seat in accordance with the present invention is basically comprised of:

an outer cover element of resin material for covering an outward side of at least one side frame member of the automotive seat, said outer cover element having: a forward region facing to a side forwardly of the automotive seat; and a backward region facing to a side backwardly of the automotive seat;

a first female engagement element provided to the forward region of the outer cover element;

a second female engagement element provided to the backward region of the outer cover element;

an inner cover element of resin material for covering the backward region of the side frame member;

a first male engagement element of resin material which is provided to a forward region of the foregoing at least one side frame member;

a second male engagement element of resin material which is formed integrally on the inner cover element;

the second male engagement element being so formed as to be resiliently deformable for latching engagement with and unlatching disengagement from the second female engagement element;

the first female engagement element having an engagement means defined therein at a predetermined position; and the first male engagement element having a latch means defined therein at a point corresponding to the aforesaid predetermined position, thus allowing the latch means to be latchingly engageable with the engagement means of said first female engagement element, with such an arrangement that, when the latch means of the first male engagement element has been latchingly engaged with the engagement means of the first female engagement element, displacement of the outer cover element relative to the first male engagement element results in dislocation of the engagement means of the first female engagement element from the predetermined position, thereby disengaging the latch means of the first male engagement element from the engagement means of the first female engagement element.

Preferably, the second male engagement element may be so formed to have a pair of spaced-apart resilient engagement pieces with a slit defined therebetween, and a latch portion formed in one of such pair of spaced-apart resilient engagement pieces.

Preferably, the first male engagement element may be so formed to have a pair of spaced-apart resilient engagement pieces with a slit defined therebetween, and the latch means of said first male engagement element may comprise a pair of latch portions which are defined in the respective said pair of spaced-apart resilient engagement pieces.

As one aspect of the present invention, the automotive seat may be further provided with a seat slide device disposed under the seat cushion frame and at least one riser member provided between such at least one side frame member and the seat slide device, wherein such at least one riser member has an outward side facing to a side outwardly of said automotive seat, and wherein the resin side cover includes another cover section for covering that outward side of riser member.

Other various features and advantages of the present invention will become apparent from the description, hereinafter, with reference to the annexed drawings.

DETAILED DESCRIPTION OF PREFERRED EMBODIMENT OF THE INVENTION

Referring to FIGS. 1 through 10, there is illustrated a preferred embodiment of resin side cover for automotive seat, as generally designated by (10), in accordance with the present invention. It is to be noted again that the resin side cover is a side cover formed from a resin material or synthetic resin material as previously stated.

Figure 1:
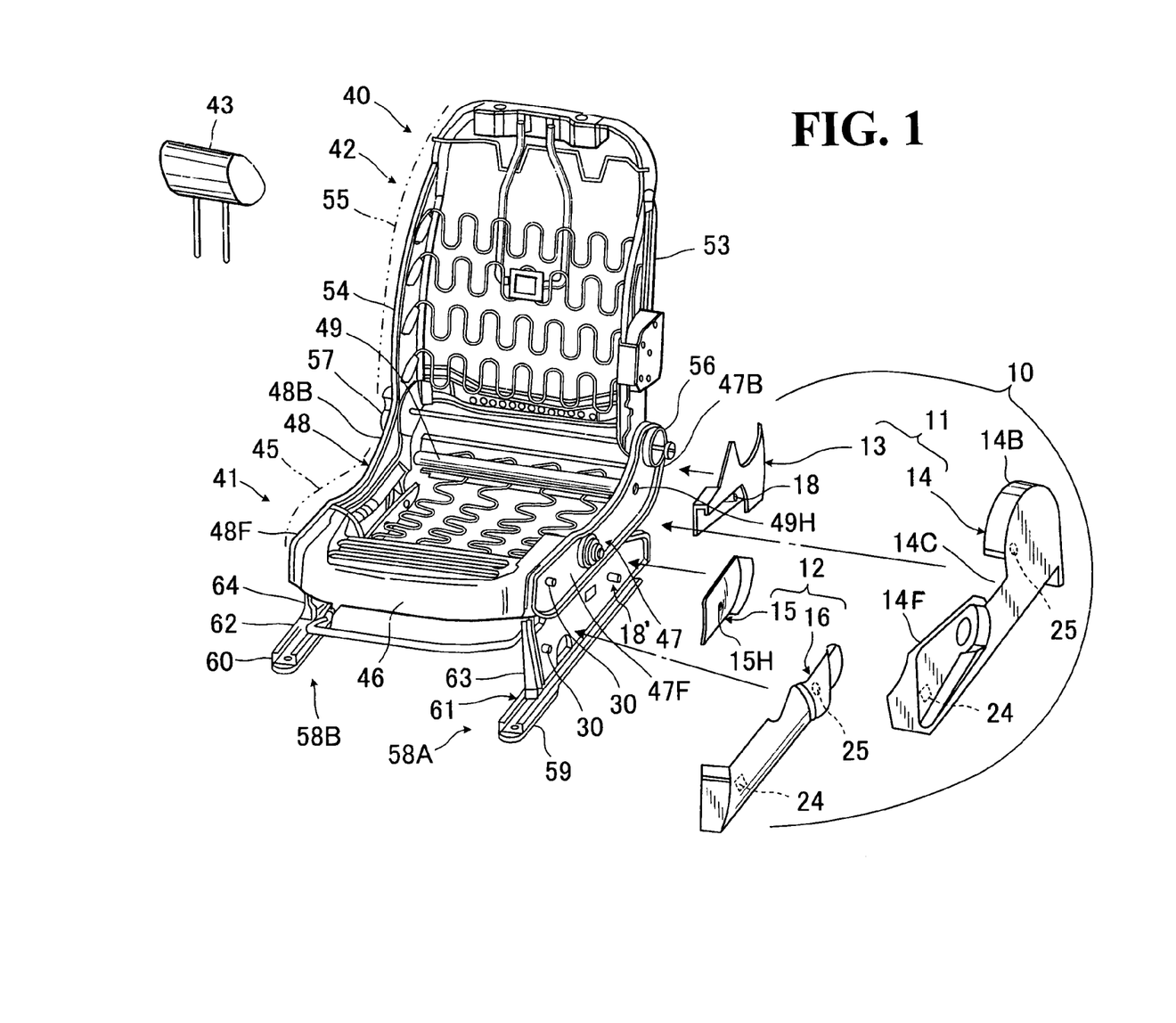
FIG. 1 is an exploded schematic perspective view showing an automotive seat and a side cover of the present invention which is applied to that automotive seat.

Reference is now made to FIG. 1 which illustrates a known automotive seat (40) to which the side cover (10) of the present invention is applied.

Typically, the automotive seat (40) comprises a seat cushion frame (41) and a seat back frame (42). As shown, the seat back frame (42) includes a pair of vertically extending first and second lateral frame members (53) (54), whereas on the other hand, the seat cushion frame (41) is basically formed by a forward frame member (46), a backward frame member (49) and a pair of first and second side frame members (47) (48).

Actually, the seat back frame (42) is upholstered as indicated by the two-dot chain line (55) to form a seat back of the seat (40), and likewise, the seat cushion frame (41) is upholstered as indicated by the two-dot chain line (45) to form a seat cushion of the seat (40).

In this seat frame structure, a pair of known first and second reclining devices (56) (57) (i.e. the so-called dual reclining device) are provided to allow for adjustment of inclination of the seat back frame (42) and a pair of known first and second seat slide devices (58A) (58B) are provided to allow for adjustment in position of the seat (40) in forward and backward directions. As shown in FIG. 1, in brief, the first and second reclining devices (56) (57) are disposed at the two respective backward regions (47B) and (48B) respectively of the first and second side frame members (47) (48) and have operative connection with the respective two end portions respectively of the first and second lateral frame members (53) (54) of seat back frame (42). As is known, the first seat slide device (58A) (i.e. a fore-and-aft seat adjustment device) is composed of a guide rail member (59) adapted for fixation to a floor (not shown) and a movable rail member (61) slidably fitted in and along the guide rail member (59). Likewise, the second seat slide device (58B) is composed of a guide rail member (60) adapted for fixation to a floor (not shown) and a movable rail member (62) slidably fitted in and along the guide rail member (60).

As shown, a first riser member (63) is fixedly connected between the movable rail member (61) and the first side frame member (47), whereas a second riser member (63) is fixedly connected between the movable rail member (61) and the first side frame member (47). Hence, the seat (40) may be adjustably moved via the two seat slide devices (58A) (58B) in forward and backward directions.

Designation (43) denotes a headrest adapted to be disposed on the top of the seat back frame (42). This is however not the subject matter of the present invention.

It is noted that, hereinafter, the term, "forward" or "forwardly", refers to a side forwardly of the automotive seat (40), whereas the term, "backward" or "backwardly", refers to a side backwardly of the automotive seat (40).

Based on the above-described automotive seat (40), an exemplary mode of the resin side cover (10) of the present invention will now be described hereinafter.

As seen in FIG. 1, the resin side cover (10) is comprised of: a first side cover element (11) for covering the afore-said first side frame member (47) where the reclining device (56) and its associated operative parts are provided; and a second side cover element (12) for covering the afore-said first riser member (63) to which an upper side of the seat slide device (58A) is connected. While not clearly shown, some mechanical parts of the seat slide device (58A) are provided in such riser member (63).

The first side cover element (11) comprises: an outer cover section (14) and an inner cover section (13), which are provided independently of each other. The outer cover section (14) is configured in a shape substantially similar to an entire outer shape of the first side frame member (47) and is of such a dimension as to substantially cover an entire outward surface of the side frame member (47). On the other side, the inner cover section (13) is formed in the illustrated shape that can be securely attached on a backward region (47B) of the side frame member (47) in such a way as to overhang the same. Detailed structure of those outer and inner cover potions (14) (13) will be described later.

The second side cover element (12) also comprises: an outer over section (16) so configured as to substantially cover an entire outward surface of the riser member (63); and an inner cover section (15) that can be attached to a backward region (47B) of the side frame member (47). Those two cover sections (16) (15) are also provided independently of each other, as shown.

Figure 2:
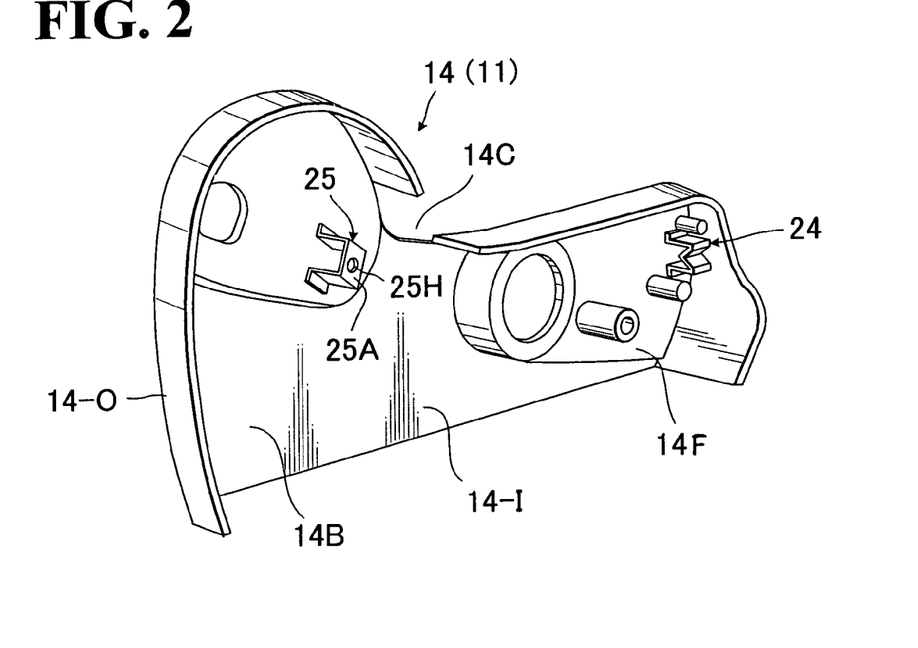
FIG. 2 is a schematic perspective view of an outer cover section of the side cover.

As best shown in FIG. 2, the outer cover section (14) of first side cover element (11) has, fixedly provided on its inward surface (14-I), a first female engagement member (24) and a second female engagement member (25), both of which form a part of means for detachably connecting the first side cover element (11) with the first side frame member (47).

Specifically, the second female engagement member (25) is shown in FIG. 2 to have a generally U-shaped configuration which includes an engagement hole (25H) formed in the horizontal top portion (25A) thereof. This second female engagement member (25) per se is formed from a rigid material such as steel so as to have that horizontal top portion (25A) and two vertical securing portions (not designated) extending from the horizontal top portion (25A). The two vertical securing portions are fixed to the inward surface (14-I) of outer cover portion (14) at a predetermined point in the backward region (14B) of that outer cover portion (14).

Figure 6:
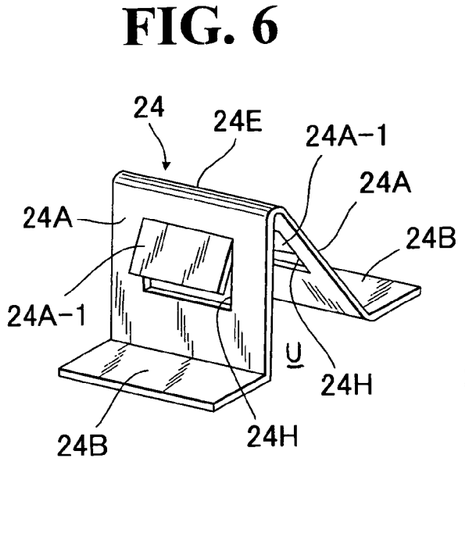
FIG. 6 is a schematic perspective view of a first female engagement element provided to the outer cove section.

On the other hand, the first female engagement member (24) is so formed from a plate spring in a generally "V" shape with a certain resilient property, which is generally known as an anchor spring in the art. As best depicted in FIG. 6, the first female engagement member (24) is formed by: a bent end portion (24E); a pair of sloped portions (24A) (24A) extending divergently from that bent end portion (24E); and a pair of horizontal securing end portions (24B)

(24B). Formed in each of the two sloped portions (24A) are a rectangular engagement hole (24H) and a detent part (24A-1) extending continuously and slant from one edge of the rectangular engagement hole (24H), which will be described later in association with a first male engagement element (30). Such first female engagement member (24) is fixedly connected with a pair of rigid support members (25) (25) by fixing the two horizontal securing end portions (24B) of the former (24) to the respective two horizontal securing end portions (25A) of the support members (25), as can be seen from FIG. 8. The two support members (25) are in turn fixed at their respective horizontal base end portions (25B) thereof to the inward surface (14-I) of outer cover potion (14) at a predetermined point in the forward region (14F) of that outer cover portion (14) as seen in FIG. 2. It is therefore observed that the V-shaped recessed side (U) of the first female engagement member (24) faces to the inward side (I), as understandable from FIGS. 2, 6 and 8.

Figure 3:
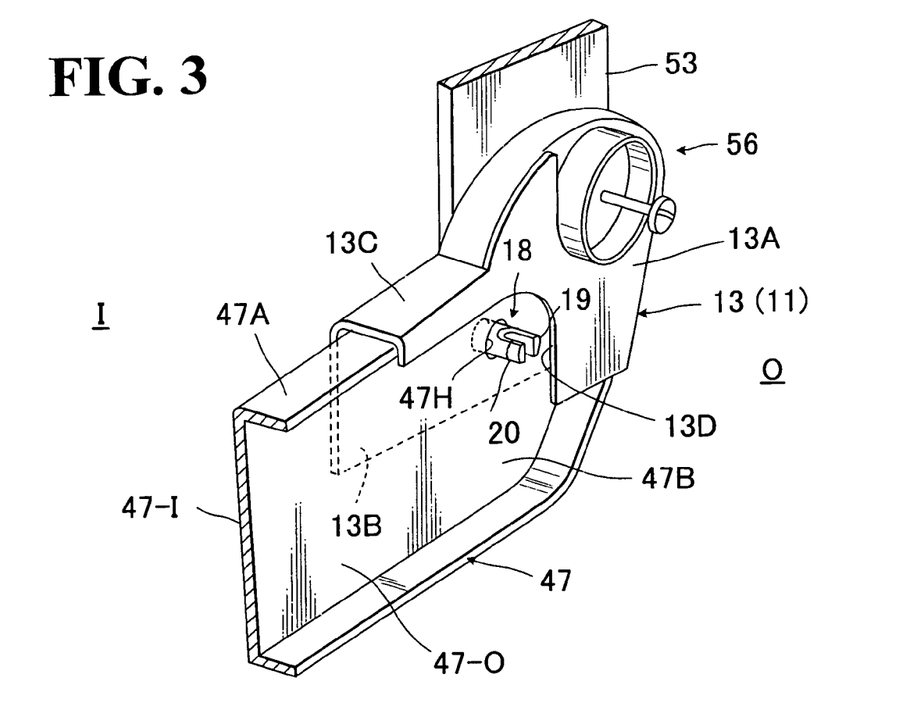
FIG. 3 is a partly broken perspective view showing an inner cover section of the side cover.
Figure 4:
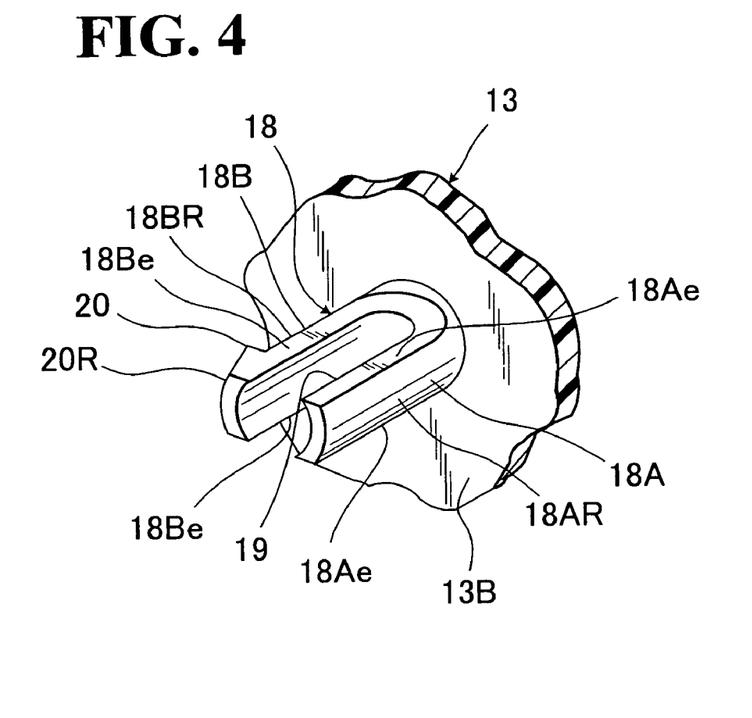
FIG. 4 is a partly broken perspective showing a second male engagement element formed integrally on the inner cover section.

FIG. 3 illustrates an inner cover section (13) of the first side cover element (11). The inner cover section (13) is formed by an outward vertical wall portion (13A), an inward vertical wall portion (13B), and a horizontal wall portion (13C) defined between the outer and inward vertical wall portions (13A) (13B). As shown in FIGS. 3 and 4, a second male engagement element (18) is formed integrally with the outward surface (13B-I) of the inward vertical wall portion (13B) so as to project outwardly therefrom.

The second male engagement element (18) is formed of a resin material and essentially composed of: a pair of spaced-apart first and second male engagement pieces (18A) (18B), with a slit (19) defined therebetween, wherein the slit (19) extends along an axis of the second male engagement element (18). The first male engagement piece (18A) has a tapered hook-like latch portion (20) formed in the free end thereof. On the other hand, the fee end of the second male engagement piece (18B) is devoid of such latch portion. As shown, both two outer surfaces (18AR) (18BR) respectively of the first and second male engagement pieces (18A) (18B) are formed round to provide a curved surface, such that both curved outer surfaces (18AR) (18BR) of the two engagement pieces (18A) (18B) extends along a circle having a center at a central axis of the second male engagement element (18). In view thereof, it is noted that a diametric width of those two male engagement pieces (18A) (18B) is slightly smaller than the diameter of the afore-said engagement hole (25H) of the second female engagement member (25). Also, an outer surface of the hook-like tapered latch portion (20) is formed round to provide a curved outer surface (20R). As will be explained later, the first male engagement piece (18A) with the hook-like latch portion (20) is resiliently bendable towards and away from the second male engagement piece (18B).

Designations (18Ae) (18Ae) respectively denotes two flat lateral edges of the first male engagement piece (18A), whereas designations (18Be) (18Be) respectively denotes two flat lateral edges of the second male engagement piece (18B).

Figure 7:
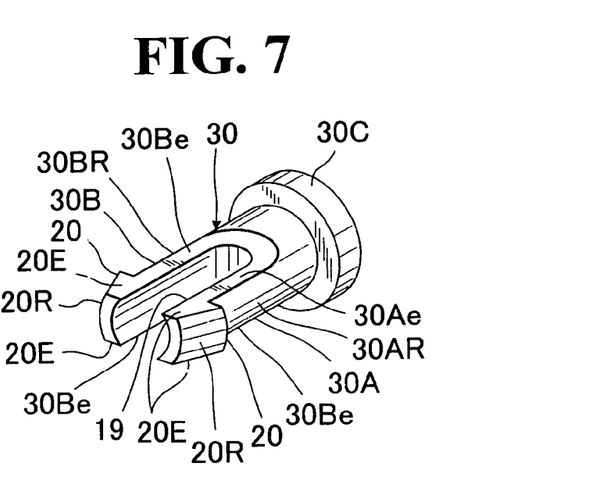
FIG. 7 is a schematic perspective view of a first male engagement element.

FIG. 7 illustrates the first male engagement element (30) formed from a resin material similar to that of the first side cover element (11) and basically identical in structure to the second male engagement element (18), excepting a securing flange portion (30C) and two tapered hook-like latch portions (20) (20).

Specifically, the first male engagement element (30) is essentially composed of: a pair of spaced-apart first and second male engagement pieces (30A) (30B), with a slit (19) defined therebetween, wherein the slit (19) extends along an axis of the first male engagement element (30). The first and second male engagement pieces (30A) (30B) each has a tapered hook-like latch portion (20) formed in the free end thereof. As shown, the two outer surfaces (30AR) (30BR) respectively of the first and second male engagement pieces (30A) (30B) are each formed round to provide a curved outer surface, such that both curved outer surfaces (30AR) (30BR) of the two male engagement pieces (30A) (30B) extend along a circle having a center at a central axis of the first male engagement element (30). In view thereof, a diametric width of those two male engagement pieces (30A) (30B) is slightly smaller than the diameter of a securing hole (47H) formed in the forward region (47F) of the side frame member (47). Also, an outer surface of each of the two tapered hook-like latch portions (20) is formed round to provide a curved outer surface (20R). As will be explained later, the first and second male engagement pieces (30A) (30B) are resiliently bendable towards and away from each other.

Designations (30Ae) (30Ae) respectively denote two flat lateral edges of the first male engagement piece (30A), whereas designations (30Be) (39Be) respectively denote two flat lateral edges of the second male engagement piece (30B).

Figure 9:
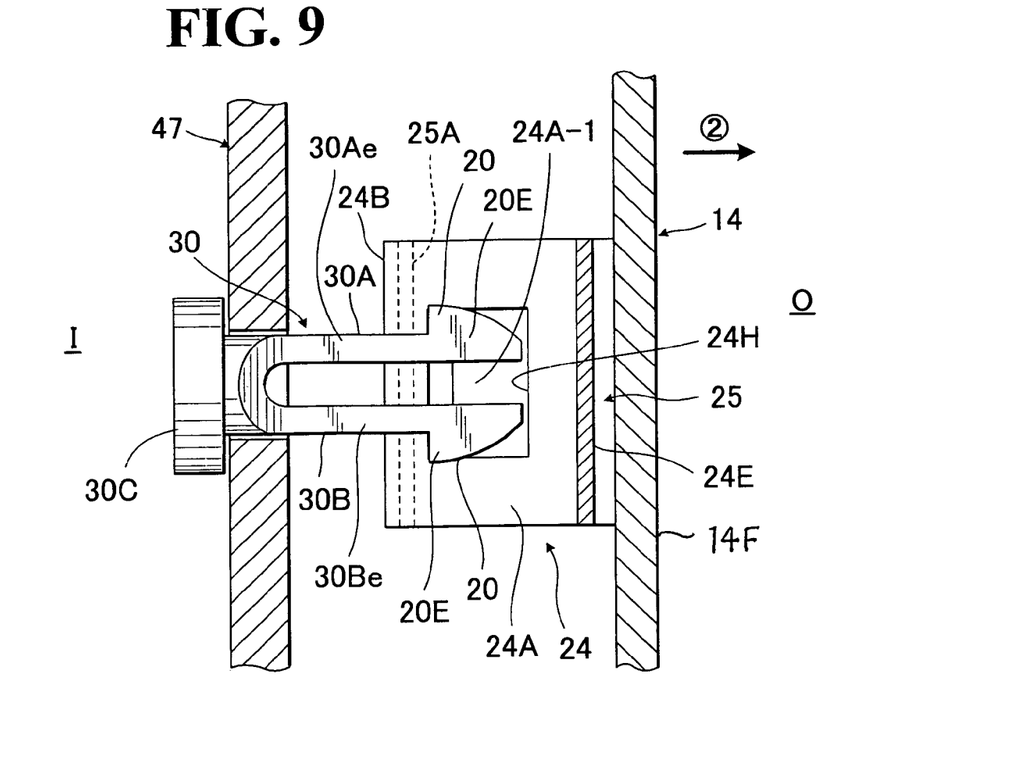
FIG. 9 is a view shown in section showing how the first female engagement element and the first male engagement element of FIG. 8 can be disengaged from each other.
Figure 10:
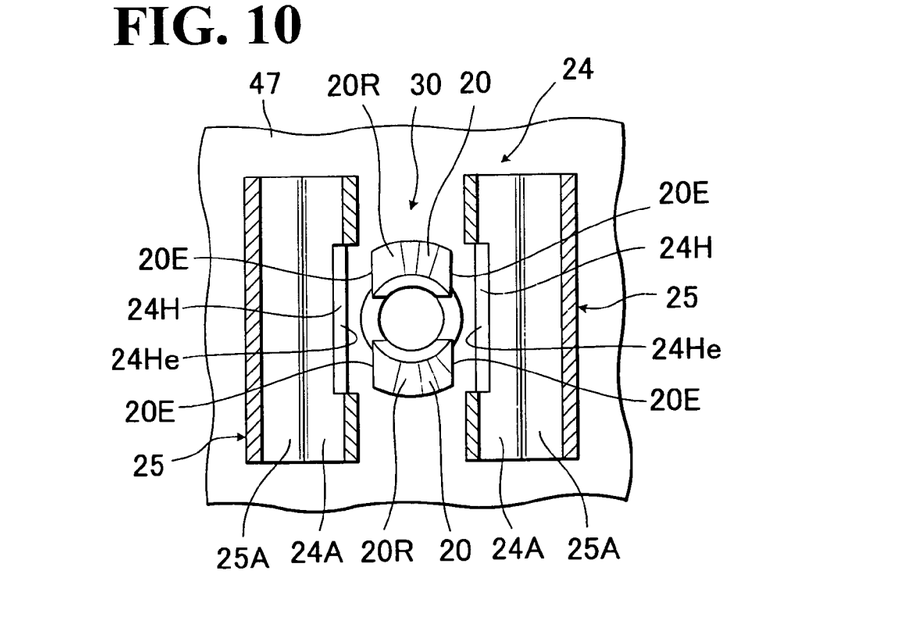
FIG. 10 is a view partially in section showing the first female engagement element and the first male engagement element of FIG. 8 disengaged from each other.

Referring to FIGS. 9 to 10, it is seen that each tapered hook-like latch portion (20) is slightly smaller in size than the afore-said rectangular engagement hole (24H), that a width between the two flat lateral edges (30Ae) and (30Ae) (or a width between the two flat lateral edges (30Be) and (30Be)) as well as a width between the two flat lateral edges (20E) and (20E) are smaller than a width between the afore-said two sloped portions (24A) and (24A) of the first female engagement member (24), and that a maximum diametric width between the two tapered hook-like latch portions (20) and (20) is greater than a width between one edge (24He) of one rectangular engagement hole (24H) and another edge (24He) of another rectangular engagement hole (24H).

Figure 8:
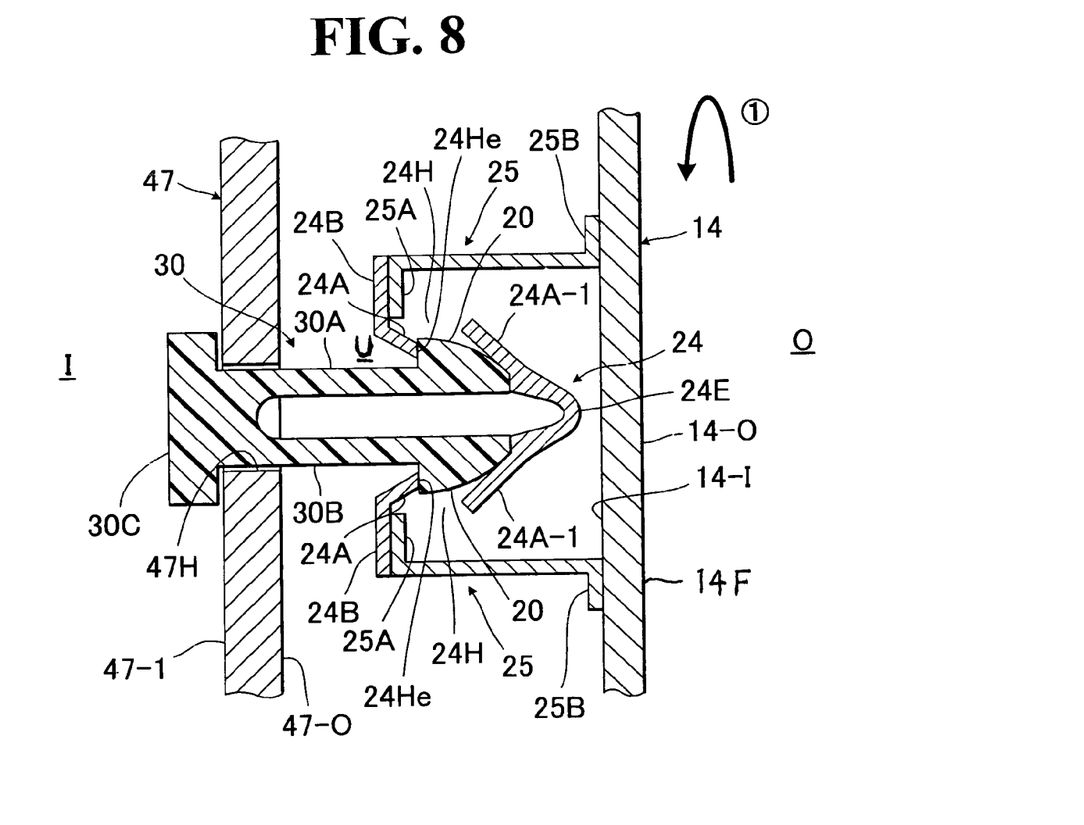
FIG. 8 is a view showing in section the first male engagement element of FIG. 7 and the female engagement element of FIG. 6 engaged with each other.

As shown in FIG. 8, the first male engagement element (30) is inserted through a securing hole (47H) formed in a predetermined point of the forward end region (47F) of side frame member (47), so as to project outwardly from the side frame member (47). This is possible because both first and second male engagement pieces (30A) (30B) are resiliently bendable, thereby allowing their respective two tapered hook-like latch portions (20) (20) to be contacted with each other to decrease a whole size thereof to a degree smaller than the diameter of the securing hole (47H), by forcibly pressing those two male engagement pieces (30A) (30B) toward each other.

It is important that the afore-said two rectangular engagement holes (24H) are disposed at a predetermined position where the two tapered hook-like latch portions (20) of the first male engagement element (30) can be engaged in those two particular rectangular engagement holes (24H), respectively, when the outer cover section (14) is attached to the side frame member (47). Hence, it is also important to dispose the two tapered hook-like latch portions (20) on the inward surface (14-I) of outer cover section (14) at a point corresponding to the respective two rectangular engagement holes (24H). This is because, as will be explained, when it is desired to remove the outer cover section (14) from the side frame member (47), the outer cover section (14) itself must be rotatively displaced relative to the first male engagement element (30) so as to dislocate the two rectangular engagement holes (24H) from the foregoing predetermined position, thereby disengaging the two tapered hook-like lath portions (20) from the respective two rectangular engagement holes (24H).

Now, a description will be made of how the above-described outer and inner cover sections (13) (14) are releasably attached to the side frame member (47).

At first, for example, a worker may forcibly warp the outward and inward vertical wall portions (13A) (13B) of the inner cover section (13) outwardly in a direction opposite to each other, so that those particular two wall portions (13A) (13B) are resiliently warped outwardly away from each other relative to the horizontal wall portion (13C). In that case, the worker should bring the thus-warped inner cover section (13) to the backward region (47B) of side frame member (47). Then, while letting the warped inward wall portion (13B) be resiliently recovered into a normal vertical state and contacted on the inward surface (47-I) of side frame member (47), the worker inserts the second male engagement element (18) through the hole (47H) to project it outwardly from the outward surface (47-O) of side frame member (47). Subsequent thereto, after having placed the horizontal wall portion (13C) of inner cover section (13) on the upper horizontal flange (47A) of side frame member (47), the worker lets the warped outward vertical wall portion (13A) be resiliently recovered into a normal vertical state so as to cover the outside of the side frame member (47), whereupon the inner cover section (13) is securely attached to the side frame member backward region (47B) as shown in FIG. 3. In this respect, it is noted that a cut-away portion (13D) is formed in the outward vertical wall portion (13A) so as to make the second male engagement element (18) accessible from the outside.

Figure 5:
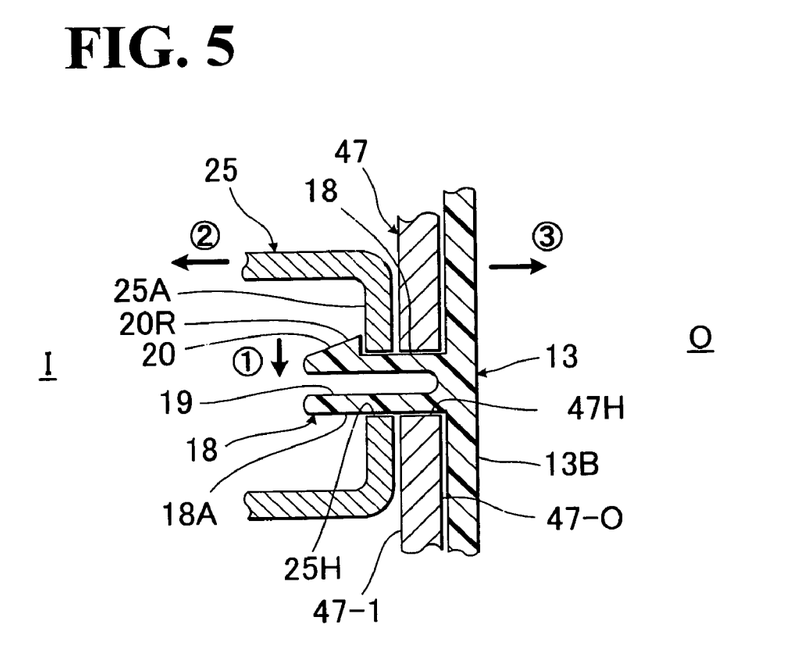
FIG. 5 is a view in section of how the second male engagement element of FIG. 4 can be deformed to unlatch from the outer cover section of FIG. 2 after they have been engaged.

Next, the outer cover section (14) is brought to the side frame member (47). The worker should align the whole outer contour of the outer cover section (14) with the whole outer contour of the side frame member (47) including the inner cover section (13), and then press the outer cover section (14) against the side frame member (47) so that the two tapered hook-like latch portions (20) of the first male engagement element (30) are resiliently inserted in the respective two rectangular engagement holes (24H) of first female engagement element (24) and abutted against the respective two detent portions (24A-1), while at the same time, the tapered hook-like latch portion (20) of the second male engagement element (18) is resiliently inserted through the hole (25H) of the second female engagement element (25). As a result thereof, with regard to the first male engagement element (30), as seen in FIG. 8, each tapered hook-like latch portion (20) thereof is pressed against the edge (24He) of the hole (24H) under a resilient biasing force of the detent part (24A-1), thereby insuring that the first male engagement element (30) is latchingly anchored and retained by the first female engagement element (24) against removal therefrom. On the other hand, with regard to the second male engagement element (18), as seen in FIG. 5, the tapered hook-like latch portion (20) thereof is contacted with the inward surface of the horizontal portion (25A) of the second female engagement element (25), thereby insuring that the second male engagement element (18) is latchingly anchored and retained by the second female engagement element (25) against removal therefrom. Thus, the outer cover section (14) is securely attached to the side frame member (27) so as to not only cover a whole of outward side of that particular side frame member (27), but also cover the outward wall portion (13A) of inner cover section (13).

Accordingly, it is appreciated that both outer and inner cover sections (14) (13) of the first side cover element (11) can easily be securely attached to the side frame member (47), without any other separate part.

Conversely, if it is desired to remove the outer cover section (14) from the side frame member (27), a worker will, for example, insert a proper jig through both two cut-away portions (14C) (13D) respectively of the outer and inner cover sections (14) (13) towards the tapered hook-like latch portion (20) of the second male engagement element (18) and then press and bend that particular latch portion (20) in the arrow direction ① in FIG. 5 into contact with the first engagement male piece (18A), so that the diametric width of the second male engagement element (18) is decreased to a degree smaller than the diameter of the engagement hole (25H) of second female engagement element (25). Then, as indicated by the direction of arrow ② in FIG. 5, the backward region (14B) of the outer cover section (14) is resiliently warped outwardly and removed from the backward end region (47B) of the side frame member (47). Thereafter, the thus-removed outer cover section backward region (14B) is rotatively displaced by a predetermined angle (say, by approx. 90 degrees) relative to the first male engagement element (30), as indicated by the curved arrow ① in FIG. 8, which in turn results in simultaneous rotation of the first female engagement element (24), thereby dislocating the two rectangular engagement holes (24H) of that particular engagement element (24) from the predetermined position, so that the two hook-like latch portions (20) are completely out of engagement with the respective two rectangular engagement holes (24H), as shown in FIGS. 9 and 10. Thus, as indicated by the arrow ② in FIG. 9, the forward region (14F) of the outer cover section (14) is removed from the side frame member (47). Accordingly, an entirety of the outer cover section (14) can easily be removed from the side frame member (47).

As indicated by the arrow ③ in FIG. 5, if it is desired to remove the inner cover section (13) from the side frame member (47), the second vertical wall portion (13B) of inner cover section (13) may be displaced away from the side frame member (47) by bending the tapered hook-like latch portion (20) as indicated by the arrow ① in the FIG. 5 and forcing the same out through the hole (47H).

With regard to the second cover element (12), as understandable from FIG. 1, the above-described first male and female engagement members (30) (24) may respectively be provided to the two forward regions respectively of the riser member (63) and the outer cover section (16), whereas the above-described second female engagement member (25) be provided to the backward region of the outer cover section (16). But, in that instance, an independent second male engagement member (18') identical in structure to the foregoing second male engagement member (18) may be provided and fixed to the backward region of the riser member (63) so as to project outwardly as in FIG. 1, and further, the inner cover section (15) may be formed with a hole (15H) which allows such second male engagement member (18') to pass therethrough. Hence, after having attached the inner cover section (15) to the backward region of the riser member (63), with the second male engagement member (18') passing through the hole (15H), the outer cover section (16) may be securely attached to the riser member (63) and removed therefrom by engaging and disengaging the first and second male engagement members (30) (18) from the first and second female engagement members (24) (25), respectively, in the same manner as described earlier.

Or, alternatively, the outer and inner cover sections (16) (15) of the second side cover element (12) may be integrally formed with the outer and inner cover sections (14) (13) of the first side cover element (11) to provide one integral cover unit. In that case, the foregoing arrangement and processes for attaching the second side cover element (12) to the riser member (53) will not be needed.

Of course, another first and second cover elements, which are respectively similar to the foregoing first and second cover elements (11) (12), may be releasably attached to the second side frame member (48) and the second riser member (64) in the same manner as described above.

It is therefore appreciated that the resin side cover (10) of the present invention can easily be securely attached to and removed from the side frame member (47) and riser member (63)), which indeed allows for reuse or recycle of the resin side cover (10).

While having described the present invention thus far, it should be understood that the invention is not limited to the illustrated embodiment, but any modification, replacement and addition may be applied thereto without departing from the scope of the appended claims.

What is claimed is:

1. In combination with an automotive seat including a seat cushion frame which includes at least one side frame member, wherein said at least one side frame member has: an outward side facing to a side outwardly of said automotive seat; a forward region facing to a side forwardly of said automotive seat; and a backward region facing to a side backwardly of said automotive seat, and wherein said automotive seat is provided with a reclining device disposed at said backward region of said at least one side frame member, a resin side cover comprising:

an outer cover element of resin material for covering said outward side of said at least one side frame member, said outer cover element having: a forward region facing to a side forwardly of said automotive seat; and a backward region facing to a side backwardly of said automotive seat;

a first female engagement element provided to said forward region of said outer cover element;

a second female engagement element provided to said backward region of said outer cover element;

an inner cover element of resin material for covering said backward region of said side frame member;

a first male engagement element of resin material which is provided to said forward region of said at least one side frame member;

a second male engagement element of resin material which is formed integrally on said inner cover element;

said second male engagement element being so formed as to be resiliently deformable for latching engagement with and unlatching disengagement from said second female engagement element;

said first female engagement element having an engagement means defined therein at a predetermined position; and said first male engagement element having a latch means defined therein at a point corresponding to said predetermined position, thus allowing said latch means to be latchingly engageable with said engagement means of said first female engagement element, with such an arrangement that, when said latch means of said first male engagement element has been latchingly engaged with said engagement means of said first female engagement element, displacement of said outer cover element relative to said first male engagement element results in dislocation of said engagement means of said first female engagement element from said predetermined position, thereby disengaging said latch means of said first male engagement element from said engagement means of said first female engagement element.

2. The combination as claimed in claim 1, wherein said second male engagement element is so formed to have a pair of spaced-apart resilient engagement pieces with a slit defined therebetween, and a latch portion formed in one of said pair of spaced-apart resilient engagement pieces.

3. The combination as claimed in claim 1, wherein said second male engagement element is so formed to have a pair of spaced-apart resilient engagement pieces with a slit defined therebetween, and a latch portion formed in one of said pair of spaced-apart resilient engagement pieces, and wherein said second female engagement element includes a hole which allows said latch portion to be latchingly engaged therewith.

4. The combination as claimed in claim 1, wherein said first male engagement element is so formed to have a pair of spaced-apart resilient engagement pieces with a slit defined therebetween, and wherein said latch means of said first male engagement element comprises a pair of latch portions which are defined in the respective said pair of spaced-apart resilient engagement pieces.

5. The combination as claimed in claim 1, wherein said first male engagement element is so formed to have a pair of spaced-apart resilient engagement pieces with a slit defined therebetween, wherein said latch means of said first male engagement element comprises a pair of latch portions which are defined in the respective said pair of spaced-apart resilient engagement pieces, and wherein said engagement means of said first female engagement element comprises a pair of holes which allow said pair of latch portions to be latchingly engaged therewith, respectively.

6. The combination as claimed in claim 1, wherein said automotive seat is further provided with a seat slide device disposed under said seat cushion frame and at least one riser member provided between said at least one side frame member and said seat slide device, said at least one riser member having an outward side facing to a side outwardly of said automotive seat, and wherein said resin side cover includes another cover section for covering said outward side of said riser member.

* * * * *